US005592536A

United States Patent [19]
Parkerson et al.

[11] Patent Number: 5,592,536
[45] Date of Patent: Jan. 7, 1997

[54] APPARATUS AND METHOD FOR FAST INITIATION OF CONNECTION IN CORDLESS TELEPHONES

[75] Inventors: Walter E. Parkerson, Fayetteville, Ark.; Roger D. Forrester, Garland, Tex.

[73] Assignee: TE Electronics, Inc., Fort Worth, Tex.

[21] Appl. No.: 541,231

[22] Filed: Oct. 12, 1995

Related U.S. Application Data

[63] Continuation of Ser. No. 964,779, Oct. 22, 1992, abandoned.

[51] Int. Cl.$^6$ ................... H04Q 7/32; H04Q 7/30
[52] U.S. Cl. ................... 379/61; 379/58; 370/349
[58] Field of Search .................. 379/61, 62, 63, 379/58, 98; 370/94.1, 94.2, 95.1, 95.3, 24, 31, 29, 60; 371/32, 33, 34, 35; 375/358, 219, 222; 340/825.5, 825.51, 825.53, 825.52, 825.07; 380/25; 381/42

[56] References Cited

U.S. PATENT DOCUMENTS

| | | | |
|---|---|---|---|
| 4,712,214 | 12/1987 | Meltzer et al. | 370/60 |
| 4,827,518 | 5/1989 | Feustel et al. | 381/42 |
| 4,979,205 | 12/1990 | Haraguchi et al. | 379/61 |
| 4,982,401 | 1/1991 | Box. | |
| 5,226,080 | 7/1993 | Cole et al. | 380/25 |

OTHER PUBLICATIONS

Spragins, John D. "Telecommunications Protocols & Design", Feb. 1991, pp. 280–285.

*Primary Examiner*—Curtis Kuntz
*Assistant Examiner*—Michael B. Chernoff
*Attorney, Agent, or Firm*—Stephen S. Mosher; David H. Tannenbaum

[57] ABSTRACT

A method of establishing communications between a first communication station and a second communication station comprising the steps of: storing a communication originate packet in the first station; storing a communication answer packet responsive to the originate packet in the second station; transmitting the originate packet to the second station from the first station; detecting the originate packet in the second station; transmitting the answer packet from the second station to the first station upon receipt of some but not all of the originate packet; and, establishing communications between the first and second station in response to receipt by the first station of the answer packet.

21 Claims, 5 Drawing Sheets

APPARATUS AND METHOD FOR FAST INITIATION OF CONNECTION IN CORDLESS TELEPHONES

This is a continuation of application Ser. No. 07/964,779, filed on Oct. 22, 1992 now abandoned.

BACKGROUND OF THE INVENTION

1. Field of the Invention

This invention relates to cordless telephones. More particularly, the invention concerns an apparatus and method for accelerating the establishment of a communication link between the handset and the base of a cordless telephone system.

2. Background Discussion

Cordless telephones normally consist of two separate stations, a base station and a handset station. The base station is plugged into a telephone outlet and comprises all the necessary equipment and electronics for interfacing with the local telephone trunk. The handset station comprises all the electronics and equipment necessary for interfacing with the user of the telephone. Such equipment includes a touch-tone key pad for dialing telephone calls and providing other features, as well as a speaker and microphone. Both stations also include radio transceivers and antennae for radio communication between the handset and the base station.

Since the base station is essentially stationary and usually must be hardwired to a telephone outlet, it will typically receive its electrical power supply from an AC wall outlet. The telephone handset, however is intended to be portable and cannot be designed for connection to an AC power outlet. Therefore, the handset receives its power from an on-board battery pack. Typically, the batteries are of the rechargeable type, and are recharged when the handset is placed in an accepting cradle on the base station and electrically coupled to the base station power supply via a recharge circuit.

In addition to the analog form of conversation that takes place on the telephone, digital signals for governing protocols between the two separate stations are also transmitted and exchanged. Typically, protocol control is carried out by transmitting digital command words and digital acknowledgment words (digital data words, collectively) between the two stations. This may be accomplished on a separate frequency or channel than the voice communications or may be accomplished directly over the voice frequency channels.

When transmitting digital words through the air via radio signals, there is a possibility that the transmitted data may not be received correctly at the receiving station. Therefore, error detection techniques are used in cordless telephones. A particular form of error detection is described in U.S. Pat. No. 4,982,401, entitled "Method and Apparatus for Detecting Transmission Errors in Cordless Telephones", issued Jan. 1, 1991, and assigned to the assignee of the present invention.

In order for a user to initiate a call on the cordless telephone handset, a protocol must be exchanged between the handset and the base station to initiate a call placed on the cordless telephone through the base station unit to the telephone lines. As well, when an incoming call is received by the base unit, communication to the cordless handset, which may be located remote from the base unit, must also be initiated also using a protocol exchange.

Each telephone set, comprised of the base station and the cordless handset station, is programmed with a security code. The security code prevents two telephone systems which may be located in the transmitting vicinity from causing crosstalk between the two separate systems. Thus, a transmission from the handset or base of one system will not be accepted by the other system because it will not recognize the security code. If there is a match of security codes, this indicates that the handset and the base station are on the same system.

Establishment of the communication protocol between the handset and the base unit of a cordless telephone occurs in a packet form, comprised of originating and answering packets. Of course, either the handset or the base can transmit the originating packet depending upon whether a call is placed from the cordless handset out or a call is an incoming call. If, for example, a handset unit is the initiating unit, it initiates a conversation by transmitting an originate packet to the base unit.

In prior art cordless telephones, the originate packet is comprised of the following parts. First, a header portion, which is a pattern sent at the beginning of the packet. The purpose of the header in the originate packet is to indicate to the receiving unit, which may be the base unit, that a call is being placed from the cordless handset and that the information it is receiving is a packet or protocol command rather than an audio transmission.

The packet or protocol command may be an exchange of packets to establish communication between the cordless and base units or may be the transmission of digital signals representing, for example, the telephone number of the call being placed by the user. Of course, the form of the packets for initiating a call and for transmitting a telephone number called will be different.

In prior art devices, the header portion of the packet is followed by a security code. The security code, as mentioned earlier, is used to match handsets and base units on the same system. Only a unit with a matching security code, whether that unit be the handset or the base station, will respond to the packet. In addition to security code, other items such as data commands, packet format identifiers, packet sequence numbers, check sums, and the like, may be included in the originate packet. The answer packet is similar to the originate packet as it includes a header, a security code, and other items. In prior art devices, an initiating unit, which again may be either the handset or the base station, will transmit an originate packet to the other unit. Once the entire originate packet has been received and the receiving unit has determined the packet was properly sent to it by identification and matching of the security code, the receiving unit will then transmit an answer packet to the initiating unit to inform the initiating unit that the packet was received correctly and that transmission of data can then proceed. If the originating unit does not receive the answer packet within a certain period of time, it will retransmit the originate packet and wait once again for an answer packet from the receiving unit. This may occur several times as designed by the programmer until the originating unit either receives a correct answer packet, or determines, by the passage at a predetermined time, for example, that transmission cannot be accomplished. The originating unit then stops transmitting the originate packet and an indication of such event given to the user.

A problem attendant with the prior art method of sending originating and waiting for responding packets, is that there is often a time lag between the time the user may attempt to place a call and the time that the user receives a dialtone. In many prior art cordless telephones, taking the telephone off-hook, does not cause the generation of a dialtone. This is because the cordless telephone is meant to be portable and carried about by the user. To automatically generate a dialtone, as is a common usage with hand wired, non-cordless telephone systems, when the handset is lifted would obviously not prove to be useful. Instead, most cordless telephones are equipped with an initiation or talk switch, which when pressed, will cause a series of events to occur and eventually a dialtone to be generated. Due to the time lag inherent in the prior art seriatim originate and answer packet, there may be a delay of some time between the time the user presses the button to initiate a call and the receipt of a dialtone. In the reverse situation, when a call is received by the base unit and is transmitted to the cordless phone, once again the user will have to press talk or other buttons and, due to the time lag inherent in the originate and receiving answering packet, there will be a time lag between the time the telephone rings and the time the user may begin conversation with the caller.

After the user of the cordless handset has received a dialtone indicating communication with the base station, numbers are pressed corresponding to the telephone number to be called. This will cause a lag, in prior art herein, due to the delay between the originate and answer packets acknowledging receipt of a signal corresponding to, for example, the number 4. The delay inherent in the prior art systems reduces the speed with which the user can initiate a call as compared to the now popular push button tone system which facilitates the rapid receipt of a dialtone and rapid initiation of a telephone call after the dialtone has been received.

In addition, in some prior art devices, the security code bits and the data bits sent by an initiating unit were exclusive—ored (XOR) or otherwise interleaved. The receiving unit would then be required to perform a similar function and separate out the data from the security code. The result was that there was an inherent time delay in determining whether the security codes of the initiating and receiving units matched. As well, in such prior art devices, the overall length of an originate packet, whether to initiate communication or to send key pad selections, would be of the same length due to the interleaving of the security code and the data to be sent.

Therefore, it is an object of the present invention to provide an improved cordless telephone set.

It is another object of the present invention to provide a cordless telephone set in which the initiation of outgoing calls and the receipt of incoming calls to the cordless handset is improved.

SUMMARY OF THE INVENTION

The present invention provides an apparatus and method for reducing the time required to initiate and receive a call on the cordless telephone system. It accomplishes this by reducing the time delay inherent in prior art cordless telephone systems in the exchange originate and answering packets. The delay is inherent in that the receiving station must examine all bits of the originate packet to determine whether the header and the security code match with the security code embedded in the receiving unit.

In the originate packet of the present invention, the originate packet is formatted such that the security code is transmitted earlier in the packet than in the prior art devices and typically immediately follows the header. In operation, if the receiving unit receives the header and the correct security code it will immediately start transmitting the answer packet while it is still receiving the remaining portion of the originate packet.

If the receiving unit detects an error in the originate packet after the start of transmitting the answer packet, it will simply stop transmitting the answer packet. If the receiving unit does not detect an error in the originate packet, the answer packet transmission will be completed in a fashion earlier than under prior art with prior art cordless telephone systems. The sending unit expects to be receiving the header of the answer packet while it is still transmitting the end of the originating packet. If, however, it does not detect the header of the answer packet from the receiving unit it will immediately send the originate packet once again, rather than waiting a long period for the answer packet to be received. Thus, by "interleaving" the sending and receiving of an answer packet, the delay in establishing a call or receiving a call by either the cordless handset or the base unit is significantly reduced, thus facilitating the more rapid placing of telephone calls by the user.

The present invention thus eliminates or significantly reduces the annoying delay which is common to prior art cordless telephone systems both in the initiation and the receipt of telephone calls.

The present invention also allows for greater than one, preferably two-level security codes, one for communication requiring high security (such as communication initiations) and a second one for communications requiring lesser security (such as key pad presses) once communication is established. This is possible due to the separation of the security code from the data to be sent. The availability of a shortened form of security code further reduces the time required to determine whether there is a match in such codes.

DETAILED DESCRIPTION OF THE PREFERRED EMBODIMENT

Figure 1:
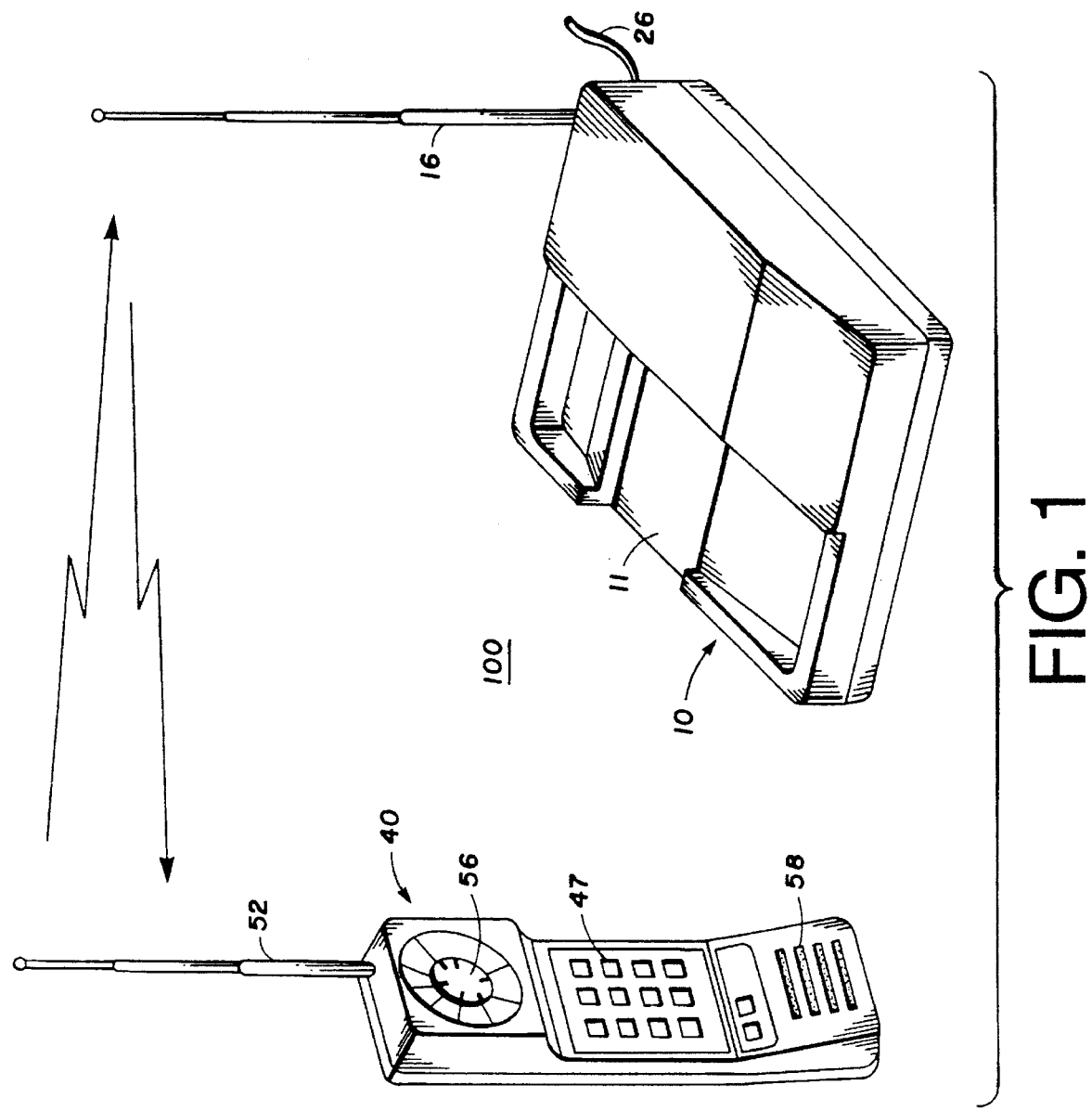
FIG. 1 illustrates a pictorial view of the cordless telephone of the present invention.
Figure 2:
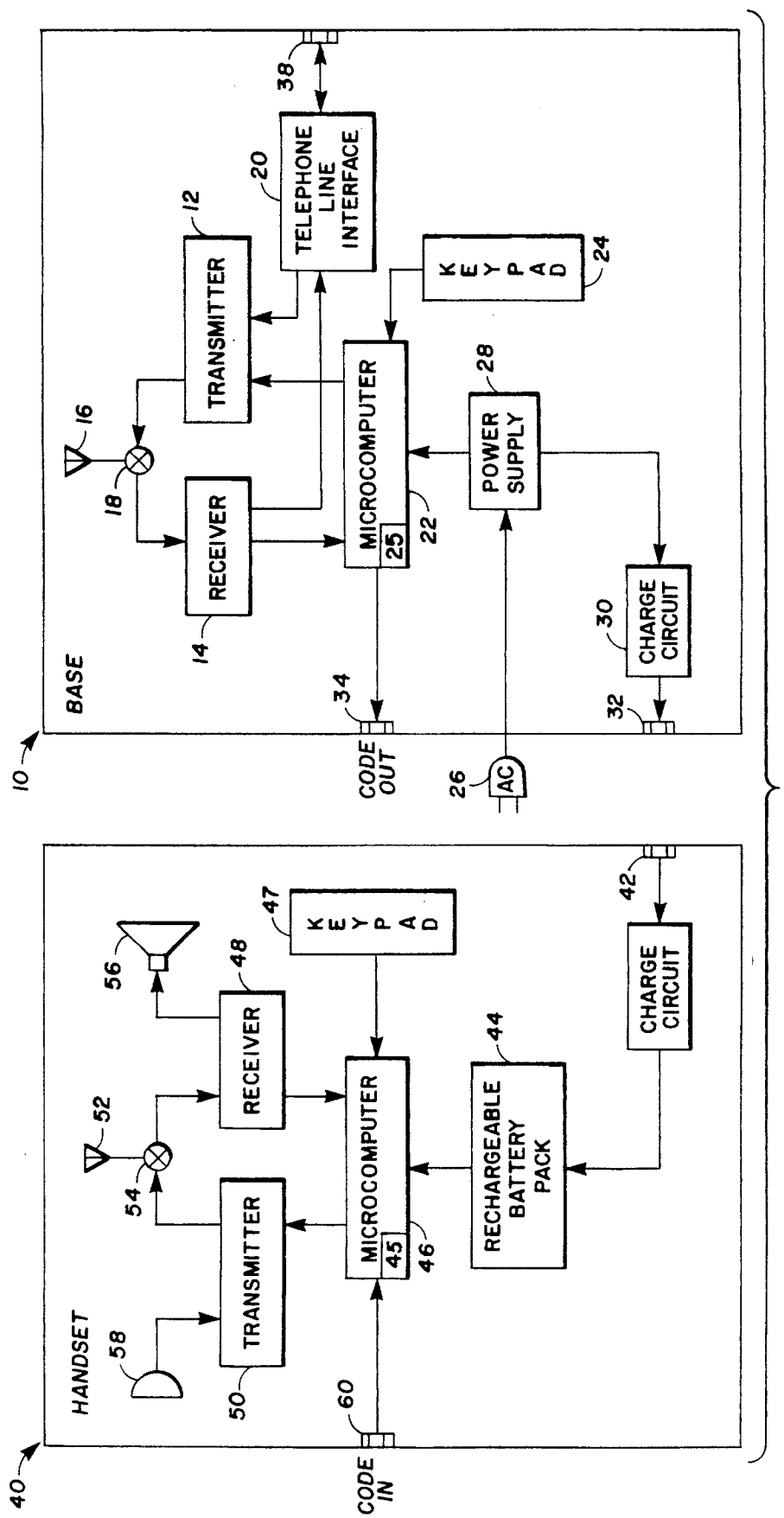
FIG. 2 illustrates a block diagram of a cordless telephone of the present invention.

FIGS. 1 and 2 show a pictorial view and a general block diagram of the major components of the handset station 40 and base station of the present invention respectively. The base station 10 is equipped with a transmitter 12 and receiver 14 interfaced to an antenna 16 through a mixer 18 in order to allow radio frequency communication with the handset station 40. The transmitter 12 and receiver 14 are further coupled to block 20, which generally represents the circuitry well known in the art necessary for interfacing with the local telephone trunk through electrical connector 38. The transmitter 12 and receiver 14 are further coupled to the microcomputer 22, which oversees all functions of the base station, including a protocol signaling between stations. A memory 25 which is illustrated as being contained internally within the microcomputer 22 but may be external of the microcomputer. Memory 25 contains various program functions, including the functions providing for protocol generation and control of transmission of the originate and answer packets. A keypad 24 for providing various function options to the user of the telephone is also included. The unit receives its power from the local source of AC power 26.

The power supply 28 converts the power from the AC power source 26 into a usable power source for the microcomputer. Additionally the power supply 28 is connected through charge circuit 30 to an outlet electrical connector 32 which can be electrically connected to the power-charge electrical connector 42 of the handset station 40 in order to charge the rechargeable battery pack 44 of the handset stations 40.

The base station is equipped with a cradle 11 for accepting the handset station 40 therein. Normally, the handset station will be in a place remote from the base station, however, when the handset station battery needs recharging, it can be placed in the cradle 11 of the base station. The cradle is designed to cause electrical connector 32 on the base station to contact electrical connector 42 on the handset station so that the power supply 28 of the base station can recharge the rechargeable battery pack 44 of the handset station.

The handset station 40 includes its own microcomputer 46 for controlling all system functions. In addition, a memory 45, which is shown as being internal to the microcomputer 46 but may be external to it. The memory 45 contains various program functions which operate the interface between the handset and the base unit including protocol functions relating to the originate and answer packets. A keypad 47 is provided to allow the user to dial numbers and select other features of the telephone set. The handset, of course, also includes a receiver 48 and transmitter 50 coupled to an antenna 52 via mixer 54 in order to allow communication with the base station 10. The receiver is further coupled to a speaker 56 of the telephone while the transmitter is coupled to the microphone 58.

The communication between the cordless handset and the base unit is duplex in that the units may both transmit and receive protocol or other information simultaneously. It is the duplex, two-way capability of the telephone unit which facilitates the operation of the present invention. Such duplex communications are well known in the art and form no part of the present invention.

The base station and handset station are further provided with electrical connectors 34 and 60, respectively, for transferring a security code word therebetween. When the handset 40 is placed in the cradle portion of the base station 10 for recharging, the code transfer electrical connectors 34 and 70 electrically engage in the same manner as the recharge electrical connectors 32 and 42. This allows the base station to recharge the batter pack 44 of the handset station and further allows the microcomputer 22 of the base station 10 to communicate new security codes to the handset station when the handset is engaged in the cradle of the base station.

As discussed in the Background of the Invention section above, in addition to facilitation telephone conversations between handset and base station, initial signaling protocol data is also transferred in order to insure rapid connection of the cordless handset to the base unit this invention provides a simple but effective means for insuring that the delay inherent in prior art systems in eliminated or substantially reduced. The general means by which protocol data are initiated, received and otherwise exchanged are well known in the art and thus form no part of the present invention.

Figure 3:
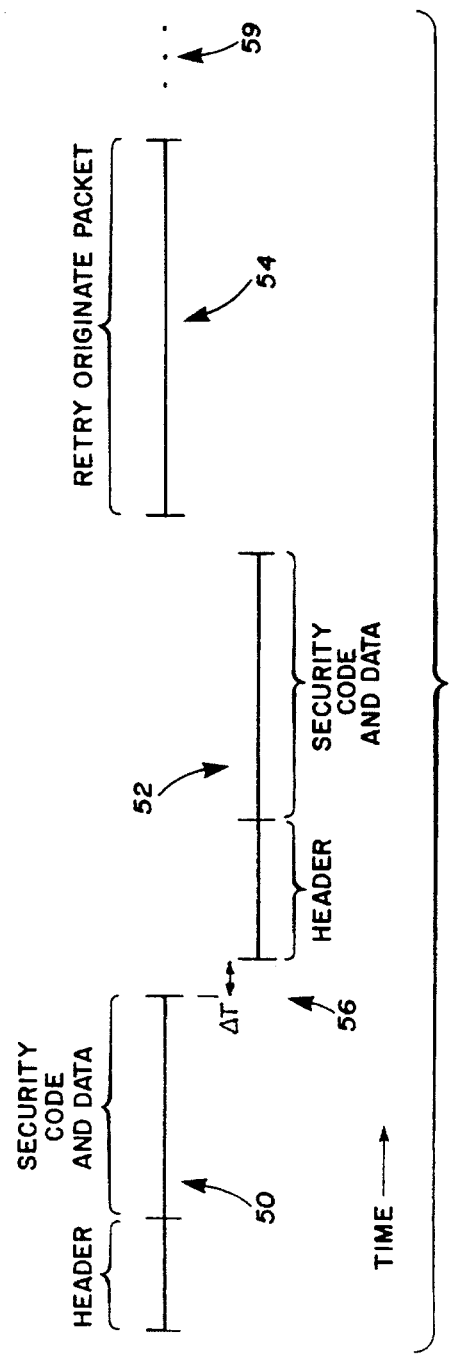
FIG. 3 illustrates the originate and answer packet formatting of the prior art.

FIG. 3 illustrates the form and timing of the originate and answer protocols in accordance with prior art devices. Turning now to FIG. 3, an initiating packet 50 contains a header portion which may be of a suitable number of bits in length followed by a security code unique to the cordless handset and matched to the base unit as well as other data which may be indicative of the type of command required when information is provided to the base unit. An answering packet 52 contains a header portion which identifies the answering packet followed by the security code, which if there is a match between the cordless handset and the base unit, will be identical with the security code within the initiating packet 50. In addition, other data and information may be contained within the security code. As can be seen in FIG. 3, in the prior art, the initiating unit, which may be the cordless hand unit or the base unit dependent upon whether the call is an outgoing or incoming call, will transmit the initiating packet to the other unit. The receiving unit will wait until all of the initiating packet has been received. If it has been received and if the security codes of the initiating and the receiving unit match, the receiving unit will then return to the initiating unit A, the answer packet 52. If, however, after a period of predetermined time the initiating unit has not received an answer packet it will send, once again, the originate packet to the receiving unit. This will be repeated a number of times as shown by the reference 58, until either a certain predetermined time has expired and/or a number of unsuccessful tries have been attempted. As can be seen with reference to FIG. 3, between the time of the end of the originate packet 50 and the answer packet 52, there will be a time delay $\Delta T$ indicated as reference numeral 56. This is the period during which the receiving unit will determine whether it has received the totality of the originate packet. Once the receiving unit has determined that it has received the totality of the originate packet and that the security codes in the originating unit sending unit and receiving unit match, it will then transmit the answer packet. It is only when the answer packet has been received in its totality by the sending unit that a connection will be made between the sending unit and the receiving unit. This is the optimal operation in the event that there is a successful match between the sending unit and the receiving unit. In the instance that the first attempt is unsuccessful because the sending unit does not receive the answer packet from the receiving unit, it will resend the originate packet to the receiving unit. This will cause a delay $\Delta T'$ which is longer than the delay $\Delta T$ in acknowledging communication between the units.

If the first attempt to establish communication is unsuccessful, a number of subsequent attempts to communicate will be made, as noted in FIG. 3 as reference numeral 59.

A number of reasons may cause the lack of success in establishing communication including interference, such as defects in the circuitry of either the cordless phone or the base line or because of an excessive distance between the hand set and the base unit. Because the originate packet and answer packet as seen with reference to FIG. 3, occur in seriatim fashion, that is, the receiving unit will wait until the entirety of the originate packet has been received, if a number of tries must be attempted before a successful connection is made there will be a delay in time in establishing communication to the user. What this means is that from the time the user presses the talk, on or start button when initiating a call, until such time as the dial tone is heard, may take several seconds. For a user accustomed to using a land-line keypad type telephone set the delay is annoying. In addition, when the user of the cordless handset, upon hearing a ring in the system (indicating a call in the system), presses once again the on or talk button, there will be a delay between the ring and communication with the incoming call. This is also annoying to the user who is accustomed to the rapid switching possible with a wired telephone connection. Therefore, in order to increase the speed with which the user of a cordless handset can both place and receive calls and thus approximate as closely as possible a wired telephone set the present invention modifies the sequencing of the originate and the answer packet.

Figure 4:
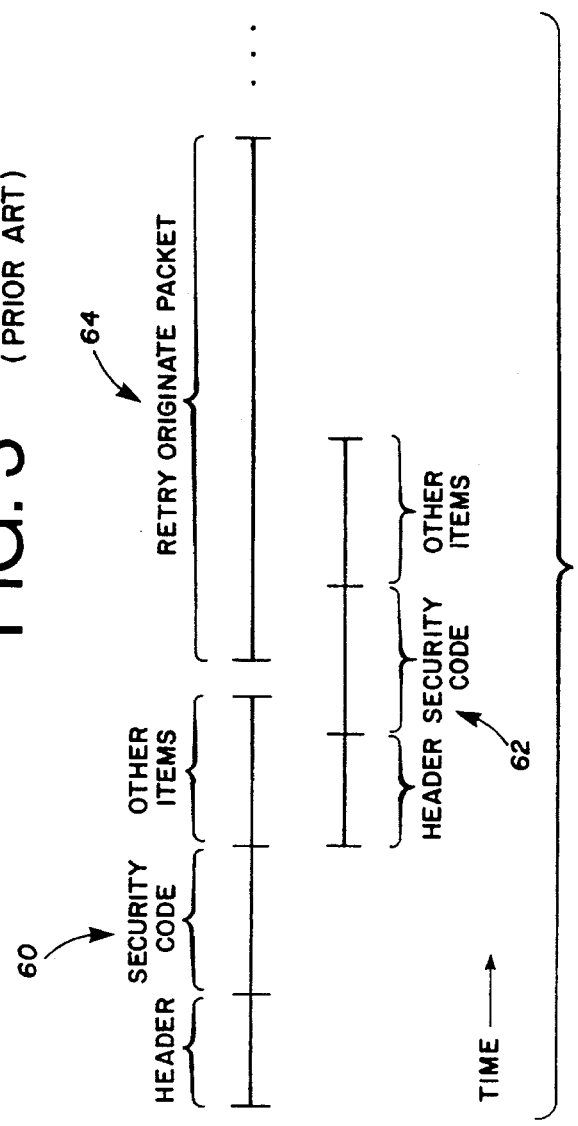
FIG. 4 illustrates the originate and answer packet formatting of the present invention.

Now turning to FIG. 4, that figure illustrates the originate and answer packets of the present invention. As with the embodiment of FIG. 3, the originate packet 60 includes a header portion, a security code portion and other items as described with reference to FIG. 3. As well, the answer packet will have a header portion, a security code portion as well as other items. The security code portion in the answer packet 62 is matched to the security code of the originate packet 60. If there is a mismatch of security codes, as mentioned earlier this indicates that the cordless handset unit and the base unit are not on the same system and this will result in a "no connection" between the cordless handset and the base unit.

The following Table I illustrates the format of the originate and answer packets of the preferred embodiment.

TABLE 1

PACKET FORMAT:

handset to base high security originate: 01fssaaaaaaaaaaaaaaaaddddddp
    f = 1 if acknowledging a previous packet
    ss = sequence number
    aaaaaaaaaaaaaaaa = 16 bit security code
    dddddd = 6 bits of data
    p = parity (1 if odd # of 1's in packet)
handset to base low security originate: 00fssaaaaaaaaddddddpttttttt
    f = 1 if acknowledging a previous packet
    ss = sequence number
    aaaaaaaa = low 8 bits of security code
    dddd = 4 bits of data
    tttt = key following pattern that continues
    as long as a numeric key is held down
    p = parity (i if odd # of 1's in packet)
handset to base answer: 1aaaaaaaap
    aaaaaaaa = low 8 bits of security code
    p = parity (i if odd # of 1's in packet)
base to handset originate: Ofssaaaaaaaaaaaaaaaaaddddddp
    f = 1 if acknowledging a previous packet
    ss = sequence number
    aaaaaaaaaaaaaaaa - 16 bit security code
    ddddddd = 7 bits of data
    p = parity (i if odd # of 1's in packet)
base to handset answer: 1aaaaaaaap
    aaaaaaaa = low 8 bits of security code
    p = parity (1 if odd # of 1's in packet)

The header of the packet format, as seen with reference to Table I is designed such that the sending unit can quickly abort the packet and immediately start resending the header of another packet which the receiving unit can resynch on. The header of the high security originate packet is 3 bits in length followed by a high security bit code of 16 bits, 6 bits of data and 1 bit or parody. A low security originate packet may be used for establishment of communications other than the establishment of an initial connection between the cordless handset and the base unit. This may be an originate packet of 8 bits, as shown in Table I above. For dialing purposes, that is, after a connection has been made between the handset and the base unit, through initiation and receipt of a high security originate packet format, dialing may be accomplished with a low security form of packet format. This is because by this time the handset and base unit are in communication. Once again, there are a number of bits for data and bits indicating a sequence number. In the answering packet, however, only 8 bits of security code (low security code) are required to acknowledge matching with the security code sent in the originate packet. A low security code may be used for any acknowledge type packet. As can be appreciated from Table I, the low security code is shown as being 8 bits and the high security code 16 bits. The actual number of bits utilized for each type code is within the choice of those skilled in the art. However, with the present invention, more than one level of security code is facilitated through the separation of the security code and the data bits. Thus, for certain communications, particularly those which are largely responsive in nature (such as in keypad dialing or an acknowledge packet), a code which is shorter in length may be provided.

Once again referring to FIG. 4, the initiating unit will place or attempt to establish communication with base unit by first sending an originate packet to the base unit. However, the program controlled by the microcomputer of the present invention will look for the header and the security code of the originate packet. Once it has received the header and security code it will immediately begin to return the answer packet. This is possible because, as mentioned earlier, with the cordless phone of the present invention two-way or duplex communications are possible, thus allowing the cordless handset to both transmit and receive. By beginning the answer packet prior to receiving all of the originate packet including its header, security code and other items portions, the acknowledgment received from the receiving unite indicates to the sending unit that there has been a match of security codes and that communication may be established. This eliminates the seriatim time lag of the prior art described with reference to FIG. 3 above. If however, the sending unit does not detect the beginning of the answer packet while it is sending its originate packet, it will assume that the receiving unit has not received, or has received incorrectly, or detected an error in the originate packet. Rather than waiting for a period of time until the answer packet may be received, thus causing a delay, the sending unit will immediately retransmit the originate packet to the receiving unit. This will be repeated a number of times either until the receiving unit acknowledges a correct originate packet or a certain period of time has expired. Upon the expiration of the predetermined period of time or a predetermined number of attempts to retry sending originate packet the programmed microcomputer will instruct the program to abort the connection. As with embodiment of FIG. 3 the reasons for halting or aborting attempts to establish communication may be due to poor line conditions, defects in either of the handset or the base unit or because the handset and the base unit are too far a distance apart to establish reliable communications. Thus, with the unit of the present invention, the lag time inherent in the seriatim send and acknowledge system of the prior art is virtually eliminated and telephone connections between the handset and the base unit occurs in a fashion and in a time, at least to the user, very similar to wired handsets and base units.

Figure 5:
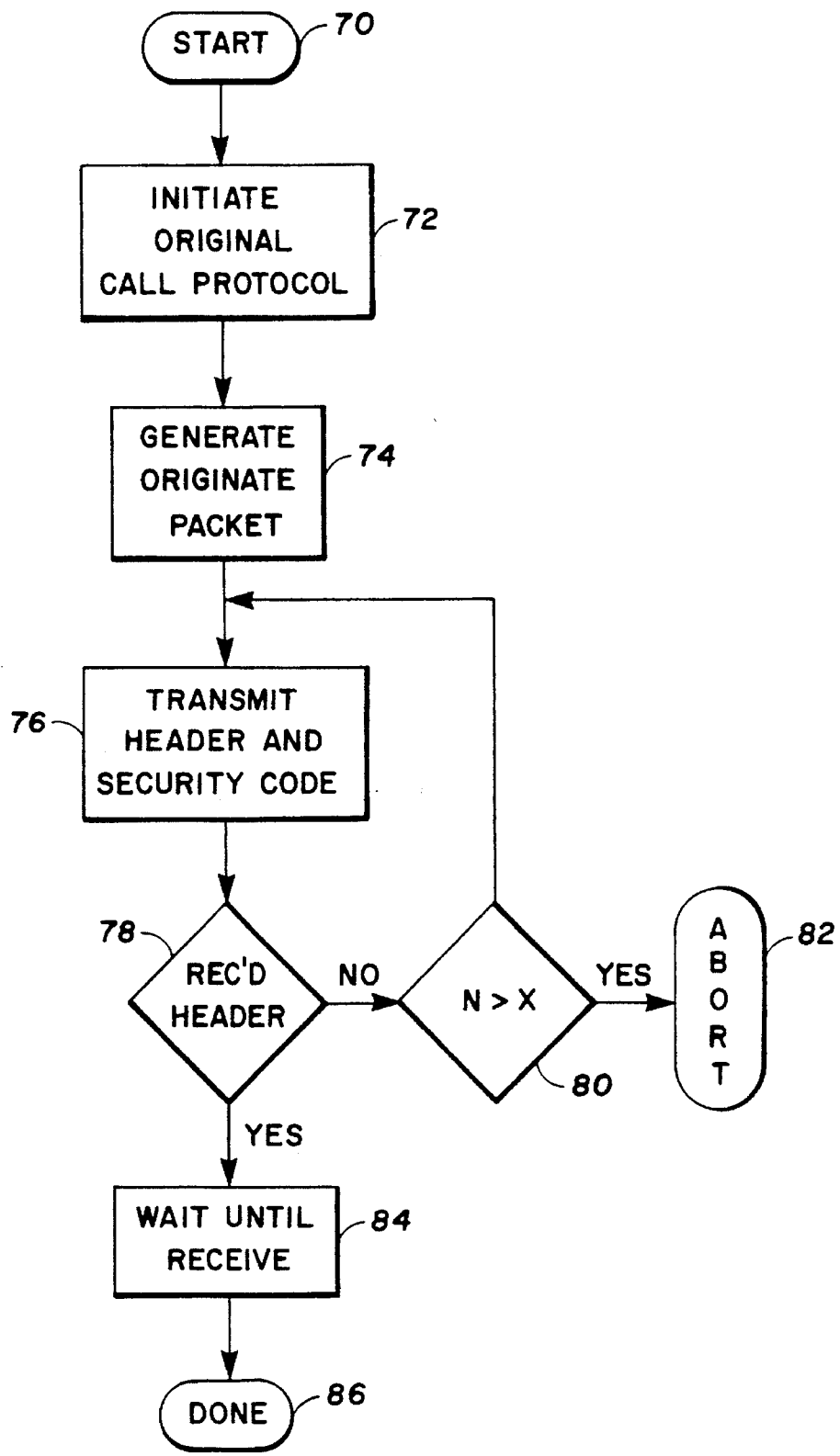
FIG. 5 is a flow chart illustrating the operation of the present invention from the view point of the sending unit.
Figure 6:
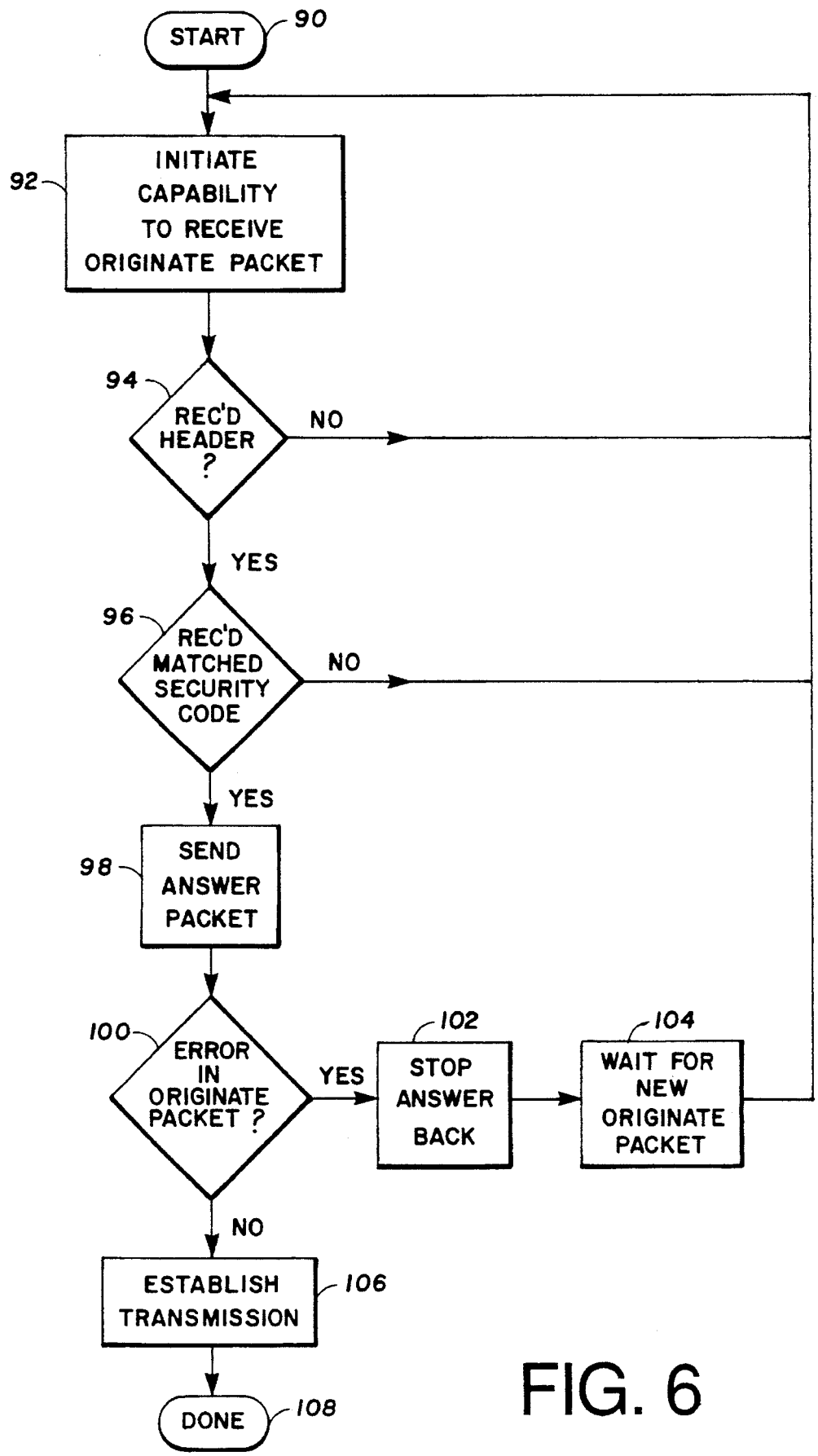
FIG. 6 is a flow chart illustrating the operation of the present invention from the viewpoint of the receiving unit.

Turning now to FIGS. 5 and 6, FIGS. 5 and 6 are flow diagrams which illustrate the operation of the program contained within or associated with the microcomputer of the present invention.

FIG. 5 represents the operation of the establishment of communication from the viewpoint of the sending unit and FIG. 6 represents the operation of the establishment of communication from the viewpoint of the receiving unit. As mentioned earlier, either the handset or the base unit can be either a sending unit or receiving unit since calls are placed by the cordless unit through the base unit to telephone lines, and as well, calls can be received by the cordless unit through the base unit over the radio connection. In both cases, it is necessary for the cordless unit and the base unit to establish communication prior to a connection being made between the speakers on either end of the line.

Referring now to FIG. 5, when the user of the cordless set wishes to place a call, he or she will actuate a button on the cordless phone which is usually a start, talk or on/off button. This will signal the cordless unit to begin originating a call by establishing a communication protocol with the base unit noted as step 72. As a result of the originating of step 72, the cordless telephone will generate an originate packet, such as the packet described in reference to FIG. 4 above in step 74. Once the originate packet has been generated, it will transmit, in step 76, the header and security code portion first of the originate packet to the base unit. Hence, because the cordless unit has two-way or duplex capability, as soon as it has transmitted the header and security code, it will wait for and expect, in step 74 to determine whether it has received the answer packet header from the receiving unit. If it has not received the header from the answer packet immediately, or almost immediately, it will retransmit its own header and security code. As seen in step 80, the attempt will be made to retransmit the header and security code of the originate packet a number of times N. However, if N exceeds a number X which may be selected by the programmer and designer by a programmer, the program will proceed to step 82, whereby the attempt at communication will be aborted. These steps 82 and 83 recognize that after a certain number of attempts to establish communication, if the number of attempts has been unsuccessful, the communication between the handset and the base unit is not possible. If, however, in step 78 the sending unit has received the header from the answer packet, it then knows that it is not necessary to retransmit its own header and security code, but will recognize, by having received the header from the receiving unit, that its own originate packet is concurrently being received properly by the receiving unit. Thus, in step 84, the sending unit will wait until it has received the entirety of the answer packet. It does so because, as mentioned earlier, in addition to the header and security code portions of the answer packet, other items included in the packet may specify certain parameters of the communication to be established between the sending unit and the receiving unit. These will be received and the operation of the cordless unit modified if necessary and as required. Once the sending unit has received the entirety of the answer packet, it will proceed in step 86 to establish communication and exit from that portion of the operation of the protocol communication.

FIG. 6 represents the operation of the establishment of communications between the handset and the base unit from the viewpoint of the receiving unit. In step 90, the receiving unit is prepared for establishing communication with the sending unit usually by the receipt of a signal from the cordless unit. The receiving unit may be initialized to receive a call from the sending unit by the establishment of a radio-link communication as a result of the user pushing the start, talk or on button of a cordless telephone set.

In step 92, the receiving unit will, under control of the microcomputer and the program, wait for a communication protocol sent from the sending unit. If, in step 94, the receiving unit has not received a header from the originate packet, it will immediately stop looking for the remainder of the originate packet and will once again look for a new header from the retransmission of the originate packet from the sending unit. If, however, the receiving unit has received the header properly, it will then proceed to step 96 in which it will attempt to receive the security code from the sending unit's originate packet and make a determination whether that security code matches the security code contained within its member unit. If it does not receive the security code, or the security code does not match, it will halt its search for detection of the remainder of the originate packet and will once again search for detection of a proper originate packet to be retransmitted. If, however, in step 96 the receiving unit determines that the security code has been received, and that, as well, the security code matches the security code of its own receiving unit, it will then proceed to step 98 and immediately send back the beginning of the answer packet to the sending unit.

As noted earlier, this sending of the answer packet to the sending unit will occur prior to having received the remainder of the originate packet from the sending unit. If, in step 100, the program determines that there is an error in the remainder of the originate packet after the header and security code in step 102 it will stop transmitting its answer back packet to the sending unit to indicate to the sending unit that there is an error in its originate packet and will cause the sending unit to retransmit the originate packet. Thus, in step 104 the receiving unit will wait for a new originate packet to be transmitted from the sending unit and will loop back to step 90. If however, the receiving unit determines that there is no error in the originate packet as received, it will then establish transmission in step 106 with the sending unit and will exit the program in step 108. Upon the completion of the steps of FIGS. 5 and 6, the dial tone will be heard by the user of the cordless unit attempting to place a call. In the case of the receipt of the answering a call, the user will establish communication with the caller on the incoming line. The process described above with references to FIGS. 5 and 6 allows for a very interactive two-way communication between the sending unit and the receiving unit with the purpose of eliminating any lag time which is inherent in a seriatim-type transmission, acknowledgment or answer system. From the standpoint of the present invention, this often annoying lag time is virtually eliminated in the present invention by the simple expedient of interleaving of the originate and answer packet. The present invention, while interleaving the operation of the originate and answer packets also provides for an early detection of errors in establishment and communication and a retransmission of the originate packet without having to wait for the entire originate packet to be received even in situations where more than one attempt must be made to establish communication between the units. In the present invention this is accomplished in a rapid manner by interleaving of retransmission of the originate packet and the answer packet.

Having thus described the preferred embodiment of the present invention it should be obvious to persons of skill in the related arts that various alterations of the invention are possible. Such obvious variations are intended to be included within the scope of the invention which is limited only by the appended claims.

What we claim is:

1. A method of rapidly establishing communication between a base station in a radio telephone system and on associated mobile unit comprising the steps of:

storing a communication originate packet comprised of a number of initial bits and a number of other bits in the base station;

storing a communication answer packet responsive to the originate packet in the mobile unit:

transmitting the originate packet to the mobile unit from the base station;

detecting the originate packet in the mobile unit;

transmitting the answer packet from the mobile unit to the base station upon receipt of the initial ones of the bits of the originate packet and without regard to receipt of the remaining other ones of the bits; and establishing communications between the base station and the mobile unit in response to receipt by the base station of the answer packet.

2. The method of claim 1 wherein the originate and the answer communication packets are each comprised of a number of bits, and wherein a number of the initial bits represent a header nonreceipted portion and a number of the initial bits represent a security code.

3. The method of claim 3 wherein the originate and the answer communication packets additionally comprise an additional number of bits representing other communication criteria and data.

4. The method of claim 2 wherein the answer packet is transmitted to the base station upon detection of the header nonreceipted portion and match of the security codes.

5. The method of claim 1 wherein the base station and the mobile unit are each parts of a cordless telephone base unit and handset, respectively.

6. The method of claim 5 whereby the handset places a telephone communication.

7. The method of claim 5 whereby the handset receives a telephone communication.

8. The method of claim 1 further comprising the step of retransmitting the originate packet in response to the nonreceipt by the base station of a portion of the answer packet.

9. The method of claim 8 wherein the portion is the header nonreceipted portion of the answer packet.

10. The method of claim 9 wherein the originate packet is transmitted a predetermined number of times before the attempt to establish communication between the base station and the mobile unit is aborted.

11. The method of claim 1 wherein the mobile unit will discontinue transmitting the answer packet to the base station upon detection of an error in the originate packet, the discontinuation signalling the base station to retransmit the originate packet.

12. Apparatus for rapidly establishing communications between a base station in a radio telephone system and an associated mobile station comprising:

means for storing a communication originate packet comprised of a number of initial bits and a number of other bits in the base station;

means for storing a communication answer packet responsive to the originate packet in the mobile station;

means for transmitting the originate packet to the mobile station from the base station;

means for detecting the originate packet in the mobile station;

means for transmitting the answer packet from the mobile station to the base station upon receipt of said initial ones of said bits of the originate packet and without regard to receipt of the remaining other bits; and means for establishing communications between the base and mobile stations in response to receipt by the base station of the answer packet.

13. The apparatus of claim 12 wherein the originate and the answer communication packets are comprised of a number of bits, and wherein a number of bits of the initial bits represent a header portion and a number of bits of the initial bits represent a security code.

14. The apparatus of claim 12 wherein the originate and the answer communication packets additionally comprise an additional number of bits representing other communication criteria and data.

15. The apparatus of claim 12 including means to transmit the answer packet to the base station upon detection of the header portion and match of the security codes.

16. The apparatus of claim 12 further comprising of a means for retransmitting the originate packet in response to the nonreceipt by the base station of a portion of the answer packet.

17. The apparatus of claim 16 wherein the nonreceipted portion is the header portion of the answer packet.

18. The apparatus of claim 17 wherein the originate packet is transmitted a predetermined number of times before the attempt to establish communication between the base and mobile station is aborted.

19. The apparatus of claim 12 further including means operable such that the mobile station will discontinue transmitting the answer packet to the base station upon detection of an error in the originate packet; and means responsive to the discontinuation for controlling the base station to retransmit the originate packet.

20. The apparatus of claim 12 wherein the originate packet comprises a header portion of 4 bits length, a security code in the range of 8 to 16 bits, 6 bits of data and a parity bit.

21. The apparatus of claim 12 wherein the answer packet comprises a header portion of one bit in length, a security code of 8 bits and a parity bit.

* * * * *